INVENTORS.
SAMUEL A. BELK
WILLIAM HUMENICK
BY
Harry C. Burgess
ATTORNEY

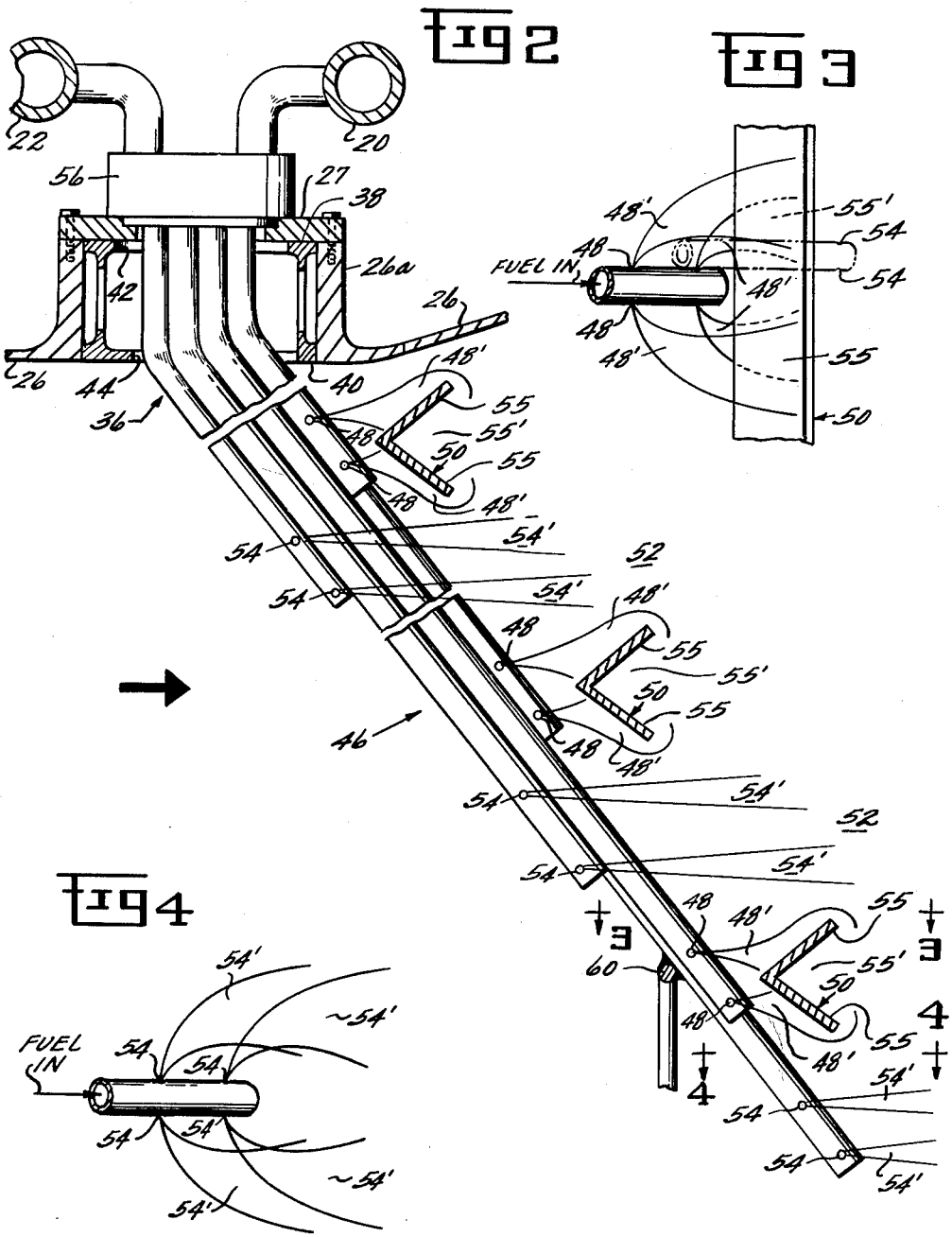

3,181,297
WIDE MODULATION COMBUSTION SYSTEM FOR JET ENGINES
Samuel Alan Belk, Cincinnati, Ohio, and William Humenick, Orangevale, Calif., assignors to General Electric Company, a corporation of New York
Filed Oct. 31, 1961, Ser. No. 149,015
2 Claims. (Cl. 60—39.72)

This invention relates generally to a combustion system for gas turbine engines and, more particularly, to an afterburner combustion system having wide thrust modulation capabilities and efficient performance over a wide range of aircraft flight altitudes and Mach numbers.

As is well known, the use of afterburning thrust augmentation devices in turbojet engines affords a substantial increase in total propulsive thrust with only a slight increase in weight for the size of the overall engine. While possibly undesirable from the standpoint of fuel economy, there are many applications where fuel economy is a less critical factor than the availability of increased thrust, particularly during short duration conditions such as take-off, or in combat in the case of military aircraft. The afterburner combustion mechanisms utilized in engines of this type commonly include two or more distinct burning zones one of which is supplied with fuel initially, the other being supplied as the total flow of afterburner fuel is increased to obtain the maximum thrust level. The necessity for multiple burner construction arises because of the fact that fuel-air ratios in the afterburner must be kept between predetermined minimum and maximum limits if the fuel is to burn properly. For example, at relatively low values of afterburner fuel flow, if the fuel were simply distributed uniformly over the entire cross sectional area of the engine tailpipe, there would not be formed a fuel-air mixture rich enough to support proper combustion. Thus it is the practice to provide two or more distinct burning zones so that a fuel-air mixture adequate for proper combustion may be maintained locally adjacent one of the burners even at afterburner fuel flow rates too low to provide a burnable fuel-air mixture throughout the entire tailpipe.

A number of arrangements have been devised whereby maximum and minimum limits on afterburner fuel flow are provided by distributing the total fuel flow in a predetermined controlled manner between the several burner elements which together constitute the afterburner structure. An example of one such mechanism is that shown in the patent to Bertaux et al., 2,984,970, entitled "Thrust Augmenting System" and assigned to the assignee of the present application. Such systems preferably are designed to provide an improved smoothness in performance at the point of cross-over, or change from single burner operation to multiple burner operation. Other such devices have been aimed at solving the problem of too large a reduction in the fuel flow into the primary burner during the cutting in, or cutting out, of the secondary burner with consequent failure of combustion in the primary burner. Even in the absence of combustion failure, or flameout, roughness in the transition between single and multiple burner operation can cause an abrupt and undesirable change in the engine thrust level. An arrangement for reducing thrust jump and temperature surge in the afterburner is shown in the patent to Vdoviak, 2,975,589, entitled "Wide Modulation Range Reheat Fuel System" and assigned to the present assignee.

The present invention is directed towards an improvement in the afterburner combustion system injector means utilized in such systems. Thus, the general object of the present invention is to provide a combustion system having wide thrust modulation capabilities with improved minimum stable combustible fuel-air ratios in the primary burning zones. A more specific object of the invention is to improve thrust jump or temperature surge conditions by minimizing thrust losses which otherwise result when burning takes place in a plurality of annular zones. A further object of the invention is to eliminate some of the undesirable thermal gradients common to the usual annular flameholder structure by providing uniform combustion in stabilizing areas within the main area of the injector. Still another object of the invention is to increase the efficiency of burning at partial afterburning, and to increase the life of the combustion system apparatus and tailpipe structure in the vicinity of the flame stabilizing means.

In carrying out our invention in a preferred embodiment, there is provided, in combination with a jet engine including an outer casing and an inner liner, a plurality of fuel injector assemblies extending radially inwardly of the casing and being bent at an angle with respect to the jet exhaust stream, the assemblies being supported in a ring structure with the bend area of the bundles being within the ring and located outside the hot exhaust stream. In addition, the assemblies comprising a plurality of tubes and are interconnected adjacent their inner ends by vibration dampening means. Means comprising first and second groups of orifices are provided, respectively, for introducing fuel directly onto and in spaced annular areas between, a plurality of flameholder means located adjacent the assemblies.

The invention will be further understood and its various objects, features, and advantages more fully appreciated by reference to the appended claims and the following detailed description when read in conjunction with the accompanying drawings wherein:

FIGURE 2 is an enlarged, fragmentary section, illustrating one of the injector tube assemblies and its relation to the flameholder means;

FIGURE 3 is a view taken along line 3 of FIGURE 2;

FIGURE 4 is a view taken along line 4 of FIGURE 2; and

Figure 1:
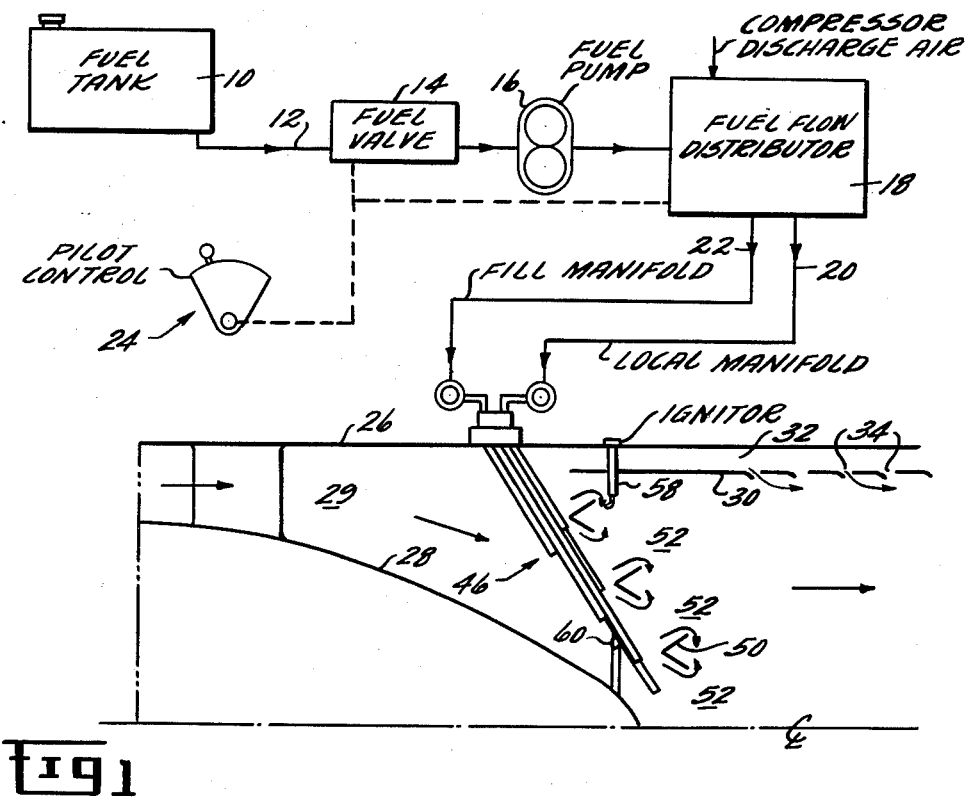
FIGURE 1 illustrates schematically a fuel supply system and a portion of a jet engine tailpipe having an improved afterburner combustion system in accordance with the present invention.

Referring now more particularly to the drawings, a schematic of a fuel supply system useful with our invention is indicated in FIGURE 1. Shown therein is a fuel tank 10 connected by a conduit 12 to an on-off fuel valve 14. In series with the valve is a fuel pump 16 which may be of any suitable type well known in the art, such as a centrifugal gear pump. The pump feeds fuel from the tank to a fuel flow distributor, or valve 18 which meters fuel to a primary, or "local" manifold 20 and a secondary, or "fill" manifold 22. Control of the fuel supply is accomplished by means of a power, or throttle lever, indicated generally at 24, which feeds a position signal to both the on-off valve 14 and the fuel flow distributor 18 to accomplish wide modulation reheat combustion.

Referring again to FIGURE 1, shown therein is an outer casing or tailpipe 26 of a jet engine, which includes a boss 26a having a cap 27. Located centrally of the tailpipe is an annular member, or cone 28 which together with the casing forms an annular passage 29 for the flow of primary combustion gases in the engine. A liner 30 is provided within the casing, immediately aft of the cone, the liner forming a passage 32 with the casing for the flow of exhaust gases. A plurality of holes, or louvers 34 are provided in the liner to permit introduction of cooler exhaust gases in passage 32 centrally of the tailpipe and liner, i.e., into the hot reheat stream.

Fixed on the casing is a ring structure, indicated generally at 36, which is used for supporting and locating the primary manifold, the secondary manifold, and the fuel injector assemblies. As seen more clearly in FIGURE 2, the ring is hollow having outer and inner walls 38 and 40, respectively, with openings 42 and 44 in the respective walls. The openings 42, 44 are arranged in pairs, equally spaced circumferentially about the casing but axially-displaced. Located within, and extending through, each pair of openings in the hollow ring structure is a bundle of fuel supplying spray bars, or injector tubes, one of which is indicated generally at 46. These tubes are so arranged in a bunch, or bundle that each tube is in contact with at least two other tubes in the bundle, the tubes being welded or otherwise permanently attached to each other longitudinally along the outer walls thereof. It will be seen that a feature of the bundles of tubes is that each bundle comprises unequal length tubes angled inwardly in the direction of the flow of the hot combustible exhaust gas stream of the jet engine, the holes 42 and 44 being axially offset so that the location of the bend is outside the hot stream, i.e., within the hollow ring 36. Thus, any stress which might be induced by reason of the bend will not be subject to the rigors of the hot combustible stream. A portion of the tubes in the bundle are connected to the primary manifold 20 and have orifices 48 arranged in pairs opening transversely to the tailpipe cross section for distributing the "local," or primary fuel flow, as now described.

As seen in FIGURES 1 and 2, located immediately adjacent and downstream of the pairs of local orifices 48 are annular flameholders which may take the form of rings, or gutters, generally indicated at 50. It will be noted that the rings, or gutters are generally V-shaped in a downstream direction and staggered in a downstream direction and that the apex of each gutter or flameholder ring is positioned immediately downstream and centrally of adjacent pairs of primary orifices. One of the benefits of the staggered flameholder arrangement, and the concommitant angling of the injector bundles, is a lower thrust loss in the "dry" or non-thrust augmented engine operating mode, which loss otherwise could be substantial due to the insertion of the burner apparatus in the exhaust gas stream. In practice, the inventors have found that in the high velocity, high temperature exhaust gas streams commonly found in supersonic jet engines, it is desirable to locate the apices of each of these flameholder gutters no more than one inch from the primary, or "local" pairs of fuel tube orifices. One purpose of this is to cool the flameholders by direct impingement of the fuel, since otherwise they could burn out due to the elevated temperature. Another benefit of the arrangement is reduced stresses which would otherwise be caused by the excessive thermal gradients in the afterburner structure. Also, the achievement of correct fuel-air mixtures adjacent the flameholders is enhanced by the extreme proximity of the flameholders; hence, use of the term "local" in describing the relationship of the parts and the burning in the immediate gutter areas.

Located in the annular areas 52 between the flameholder means 50 are a plurality of secondary, or "fill" orifices 54, a primary feature of our improved afterburning system. These orifices are in the remaining tubes in the bundle, and also open transversely to the direction of flow of the main exhaust gas stream indicated by the large arrow in FIGURE 2, the tubes being connected to the "fill" manifold through a suitable flow divider 56 which also apportions fuel to the "local" tubes.

In operation, as perhaps more clearly shown in FIGURES 3 and 4, a small quantity of fuel is injected into the main gas stream from the local, or primary fuel tube orifices immediately upstream of the flamestabilizers, or gutters. This fuel is entrained into the gas stream and circulates through the stabilizing zone 55' between the arms of the V-shaped flameholders, the fuel also impinging directly onto the divergent walls 55—55 of each gutter, as indicated by the general flow stream lines 48'. A plurality of ignition devices, one of which is indicated at 58, are provided around the outer flameholder ring to cause ignition of the primary fuel. Ignition is spread inwardly through the other flameholders by means of flame propagation. Since only a small portion of the gas entering the combustion system is carbureted initially, a locally rich combustible fuel-air mixture is obtained at a lean overall tailpipe fuel-air mixture. For minimum, or partial reheat thrust augmentation, fuel is injected to the primary orifices and only at very high thrust augmentation settings is fuel added to the air stream through the secondary, or "fill" orifices located in the annular spaces between the gutters. Hence, the secondary fuel flow smoothly fills in between the areas of "local" burning according to a predetermined schedule dictated by the demands of engine operation, as shown by the general flow stream lines 54' in FIGURE 4. Since only under extreme conditions, e.g., take-off or military combat, does the need arise for this additional ejection of fuel, the liner 30 is not subject to extreme high temperatures for a very long period of time. In other words, this period is a very short portion of the mission in comparison with the total mission time. For the best performance at the maximum reheat, or thrust augmentation operating mode, the orifices will be arranged so that the "local," or primary fuel flow will be a smaller percentage of the total fuel flow than will the secondary, or "fill" fuel flow.

Figure 5:
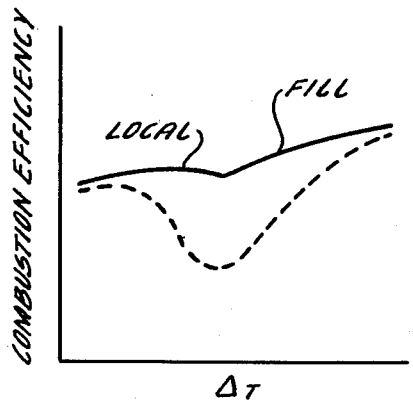
FIGURE 5 is a performance plot of combustion efficiency v. temperature change in the tailpipe illustrating some of the advantages of the present system over prior art systems.

FIGURE 5 is a performance plot of a combustion system having the local and fill fuel injection apparatus described above. Not that only slight variation occurs in the combustion efficiency curve from minimum reheat to maximum reheat with use of our invention, as compared to a known prior art arrangement whereby a large "dip" in the combustion efficiency curve occurs in the region of the changeover from single to multiple burning.

The applicants have found it to be advantageous to place the "local" fuel injection tubes extremely close, i.e., not more than one inch from the flame stabilizers, so that problems of self-ignition of the fuel air mixture and partial or complete burn out of the flame stabilizers can be minimized. In addition, by the reason of the arrangement described whereby the fuel tube bundles are hung, or attached to the outer casing 26 by means of the hollow ring 36, problems of differential thermal expansion between the bundles (generally cool) and the liner and/or annular inner member 28 (generally hot) are eliminated. Thus, instead of attaching the injector bundles to the liner or supporting them from the inner member, the bundles are supported from a cooler structural member. This keeps the injectors from contacting the hotter parts, such as the inner cone, which could move axially a substantial distance due to differential thermal expansion.

Also indicated in FIGURE 2 is a relatively small, solid ring 60 which is attached to the inner end of the bundles approximately three-fourths of the length of each bundle when considered transversely of the tailpipe. The ring is located preferably between the middle and inner flameholder gutters and serves a dual purpose. Firstly, it interconnects and props, or supports the angled bundles of tubes which are not otherwise supported from the cone 28, but rather are preferably supported from the outer casing only, for the reasons given above. The location of the supporting point, or point of attachment of the ring 60 has been optimized from the standpoint of assuring minimum injector tube bundle stress levels. Secondly, the ring serves as dampening means to restrain the vibration of each bundle in two directions, and thus impede the natural vibrational modes of the bundles. In other words, the bundle is in the nature of a cantilevered beam and the ring precludes movement or flexure of the end of each individual bundle outwardly toward the casing, or in torsion around the axis of the bundle. Thus, the ring is also located so as to optimize the vibration dampening effect. Finally, with proper location of the ring there is no necessity of additional support of the injector bundles from the inner cone. The flameholder gutters themselves may be supported in the manner disclosed in the patent to Krabacher et al. 3,056,261 assinged to the present assignee.

What we claim as new and desire to secure by Letters Patent is:

1. In a combustion system for an axial-flow jet engine, an outer casing, an inner liner spaced from said casing, a hollow outer support ring mounted on said casing, said ring having pairs of equally circumferentially spaced but axially-displaced holes in outer and inner walls thereof, a plurality of fuel injector bundles located in said holes, said bundles being bent in the direction of flow of the jet engine exhaust, the bend area of each bundle being within said hollow outer ring and without the hot stream of said engine exhaust, each of said bundles comprising a plurality of tubes of unequal length, a first group of said tubes having orifices supplying primary fuel and a second group of said tubes having orifices supplying secondary fuel, a plurality of annular flameholders V-shaped in cross-section and radially spaced within said liner immediately downstream of said bundles, said first group of orifices emitting said primary fuel transversely of said exhaust gas stream and immediately upstream of the apex of said flameholders whereby the force of said streams turns said primary fuel flow downstream directly onto the divergent sides of said V-shaped flameholders for local burning immediate said flameholders, and said second group of orifices emitting said secondary fuel transversely of said exhaust gas stream and radially intermediate said first orifices whereby the force of said stream turns said secondary fuel flow directly downstream into the areas intermediate each of the flameholders for fill burning in said areas.

2. In an afterburner combustion system for an axial-flow jet engine, an outer casing comprising fore and aft sections, a hollow spacer ring joining said casing sections, said ring having pairs of equally circumferentially-spaced, axially-displaced holes in outer and inner walls thereof, a plurality of fuel injector bundles located in said holes, said bundles being bent in the direction of flow of the engine exhaust gases and extending generally radially inwardly of said casing, the bend area of each bundle being within said hollow spacer ring walls, each of said bundles comprising a plurality of tubes of unequal length, a plurality of spaced concentric annular flameholders located immediately downstream of said tube bundles and radially staggered with respect to the engine axis, and fuel supplying means connected to said fuel injector bundles, said bundles including a first plurality of orifices arranged in pairs to emit fuel transversely of the exhaust gas stream whereby the force of said stream turns the fuel from said pairs of orifices directly downstream and onto the flameholders for local burning and a second plurality of orifices spaced longitudinally of said tubes and located radially intermediate the spaced concentric flameholders and emitting fuel to the areas between said flameholders for fill burning.

References Cited by the Examiner

UNITED STATES PATENTS

| | | | |
|---|---|---|---|
| 2,720,078 | 10/55 | Day et al. | 60—39.72 X |
| 2,926,495 | 3/60 | Benson | 60—39.74 |
| 2,932,944 | 4/60 | Morley | 60—35.6 |
| 2,974,486 | 3/61 | Edwards | 60—39.72 X |
| 2,975,589 | 3/61 | Vdoviak | 60—35.6 |
| 2,978,870 | 4/61 | Vdoviak | 60—39.74 |
| 3,002,353 | 10/61 | McEneny | 60—39.74 |

SAMUEL LEVINE, *Primary Examiner.*